3,567,795
REFINING PROCESS OF HYDROCARBON
POLYMER
Tetsuo Ishikawa and Yoshio Kadowaki, Tokyo, and Teruo Kajikawa and Shinji Uehara, Kawasaki, Japan, assignors to The Furukawa Chemical Industries Co., Ltd., Tokyo, Japan
No Drawing. Filed June 17, 1968, Ser. No. 737,323
Int. Cl. C07c 3/18
U.S. Cl. 260—683.15
6 Claims

ABSTRACT OF THE DISCLOSURE

Process of refining hydrocarbon polymers obtained by liquid phase polymerization with a Friedel-Crafts catalyst, wherein the polymer solution, containing catalyst, is contacted with an aqueous solution of a water-soluble salt selected from the group consisting of nitrates, sulphates, thiosulphates, phosphates, oxalates and silicates, making it possible to eliminate the catalyst as a decomposition product.

BACKGROUND OF THE INVENTION

This invention relates to a new process of eliminating polymerization catalysts from polymerization products obtained by the process of making liquid or semi-solid hydrocarbon polymers with a catalysts of Friedel-Crafts type.

In using a Friedel-Crafts type catalyst such as anhydrous aluminum chloride for the manufacture of liquid or semi-solid hydrocarbon polymers such as butylene polymers, propylene polymers and the like, there arises a problem as to how to separate the catalyst from the product. Product from which the catalyst has not been sufficiently separated is colored and is not desirable from the viewpoint of quality and performance. A colored product cannot be decolored with ease, and therefore, it is desirable that the catalyst be eliminated from the product while it is in the form of reactor effluent solution after polymerization reaction has taken place.

Such physical refining methods as settling, adsorption and the like, have already been proposed as methods for eliminating the catalyst, but it is difficult for these methods to effect complete elimination of the catalyst. Consequently, when such physical refining methods are used, the product gradually colors on standing due to the catalyst that remains in the product. For the purpose of eliminating such a problem, various methods have heretofore been tried of making the catalyst inactive and removing it immediately after the termination of polymerization reaction. Such methods which aim at eliminating the catalyst after making it inactive by decomposing or by changing it into a complex, involve treating it with ammonia gas, ammonia water, an aqueous solution of sodium hydroxide, calcium hydroxide and the like, an aqueous solution of hydrochloric acid, sulfuric acid and the like, alcohols, ketones, aldehydes, ethers, carboxylic acids, water and the like. However, treatments with these chemicals do not always yield satisfactory results. For example, in the case where aluminum chloride catalyst is used, treatment with an aqueous solution of an alkali or with water produces aluminum hydroxide which is itself very difficult to eliminate. In case of treatment with an aqueous solution of acids, equipment and apparatus are corroded, and moreover, because the acid acts upon the polymer and because it cannot be eliminated by washing with water alone, the acid that has remained colors the polymer and makes some of its physical properties poorer. In case of treatment with organic chemicals, the chemical that has been used remains in the polymer, and not only affects its character but also dissolves into the polymerization solvent where it can be a source of difficulty. For example, where the solvent is to be recovered for re-use, the chemical may act as a catalyst poison, and so there arises the problem of separating it. In the case where ammonia gas is used because the settling speed of the complex that is produced is smaller than aluminum chloride alone, it becomes difficult to separate by settling, and there arises the necessity of eliminating most of it by adsorption with clay or by filtration. When clay is used, its power of adsorption is reduced quickly and filtration is a very difficult process, and if ammonia remains in the polymerization solvent in either of these cases, it acts as a catalyst poison when the solvent is used again.

The object of this invention is to provide a method of eliminating Friedel-Crafts catalyst from hydrocarbon polymers avoiding the problems mentioned above and thereby manufacturing a highly refined polymer especially where butylenes are to be polymerized by a catalyst of Friedel-Crafts type.

In the process of this invention, the catalyst is made to lose its activity and at the same time to decompose by bringing the hydrocarbon polymer, for example, from butylene, obtained by solution polymerization in hydrocarbons with a Friedel-Crafts type catalyst (butylene or other polymer dissolved in solvent shall be referred to for purposes of exemplification simply as "polymer solution" hereinafter), into contact with an aqueous solution of a water-soluble salt selected from the group consisting of nitrates, sulphates, thiosulphates, phosphates, oxalates and silicates. The catalyst is eliminated by letting the resulting product of decomposition move from the polymer solution into the aqueous solution.

It is needless to say that it is more effective if a portion of the catalyst is eliminated by settling before the polymer solution is made to contact the aqueous solution of the above-mentioned salt.

The decomposition product of the catalyst produced in accordance with this invention moves from the polymer solution side to the aqueous solution side, and when it has moved, the polymer is separated and subjected to refining treatment. This treatment can be conducted in such a way as (1) washing with water only, or (2) washing with water, drying by use of calcium chloride or other drying agent and refining by passage through layers of active clay or acidic clay or by stirring with admixed clay, or (3) omitting washing with water, and using only drying and clay treatment. By these and other techniques our object can be attained. Washing in advance of clay treatment is remarkably effective in the prevention of rapid reduction in the activity of the clay used and is the preferred technique.

After treatment with the aforementioned salt or salts, the polymer solution contains a colorless and transparent polymer of very high purity. Unreacted gas and solvent can be separated with low molecular weight polymers to yield butylenes polymer of high purity and stability.

The amount of the above-mentioned salts to be used for the decomposition of entrained catalyst differs depending upon the kind of catalyst and salt. Where aluminum chloride catalyst, for example, is used, the amount of salt if it is sodium nitrate is over 3 mols to 1 mol of catalyst; more than 1.5 mols in the case of sodium sulphate, ammonium sulphate or sodium oxalate; and more than 1 mol in the case of sodium phosphate. The aqueous solution of these salts brings about sufficient catalyst decomposition even if it is weak in concentration, but it is also effective if a small quantity of an aqueous solution of high concentration is used in circulation.

Because the catalyst reacts very quickly with the above-mentioned salts, the time required for the polymer solution to be in contact with the aqueous solution of salts need not be long. A few minutes are ordinarily enough in cases where the two are mixed and stirred, for example, from 1 to 10 minutes.

Decomposed catalysts, some water-soluble and other water-insoluble, move into the aqueous solution from the polymer solution as hereinbefore described and the polymer solution becomes colorless and transparent. For example, in the case where a sodium phosphate has been used, the decomposed product of pyrophosphate is water-soluble, while the decomposed product of ortho- or metaphosphate is water-insoluble. Separation of the polymer solution from the aqueous solution is easy, almost perfect separation being effected in a short time by leaving it quiescent after the stirring operation has been finished. The separated polymer solution is transparent and no catalyst complex can be seen in it.

The decomposed product of the catalyst differs depending upon the salt used, and in cases where a water-soluble salt such as a halide is used, a hydrogen halide is produced which may corrode the equipment. In the case of the above-mentioned salts used in this invention, very little amount of a hydrogen halide is produced, reducing corrosion to the minimum.

A further understanding of this invention will be obtained by referring to the examples hereinbelow.

Example 1

Into a 1 liter autoclave made of glass fitted with stirring apparatus, thermometer and attached jacket is put 500 grams of a cooled mixture of butane and butylene containing 22.4% isobutylene. Next, 3 grams of aluminum chloride anhydride dispersed in 30 grams of hexane is added. Polymerization is allowed to process for 1.5 hours at 0° C. The polymer solution thus obtained is removed into a 2 liter autoclave made of glass, fitted with a stirring device, and containing 800 grams of aqueous solution of 1% sodium sulphate. The mixture is stirred for 5 minutes. After stirring, the mixture is left in a quiet state for about 2 minutes whereupon the polymer solution completely separates from the aqueous solution and becomes transparent. After separation, the polymer solution is stirred in a similar autoclave with 800 grams of water, separated, and dried with calcium chloride. It is then passed through a layer of clay in a cylindrical pipe of glass 2.5 centimeters in diameter and 20 centimeters in length. After volatilization of butane from the polymer solution, the polymer is heated to about 100° C. with nitrogen gas passing through it at the same time. There is obtained 85 grams of colorless, transparent liquid polybutene. The average molecular weight of this polybutene is 650, its aluminum content is only 40 p.p.m., chlorine content is only 18 p.p.m. and no detectable sodium and sulfur are found.

In contrast, the aluminum content of the ordinary commercially available liquid or semi-solid polybutenes can be 100 to 150 p.p.m.

Example 2

Into the same autoclave as used in Example 1, 500 grams of a cooled mixture of butane and butylene containing 23.7% isobutylene is placed. Next, 2.5 grams of aluminum chloride anhydride dispersed in 25 grams of hexane is added and polymerization is allowed to proceed for 2 hours at −5° C. The polymer solution obtained is stirred for 5 minutes in a 2 liter glass autoclave fitted with a stirring device and containing 800 grams of 5% aqueous solution of ammonium sulfate. When left in a quiet state, the polymer solution completely separates from the aqueous solution in about 2 minutes and becomes transparent. After separation, washing with water, drying, treatment with clay and separation of unreacted gas have been conducted as in Example 1, 80 grams of a colorless, transparent liquid polybutene is obtained. The average molecular weight of this polybutene is 1200, aluminum content 30 p.p.m., chlorine content 16 p.p.m. and no detectable ammonia and sulfur can be found.

A similar result is obtained when an aqueous solution of 5% ammonium sulfate, once used, is again used for the treatment of the polymer solution.

Example 3

150 grams of 98% liquefied isobutylene was put, together with 600 grams of hexane as solvent, into a 2 liter glass autoclave fitted with a stirring device, thermometer and jacket 2 grams of aluminum chloride anhydride dispersed in 20 grams of hexane was added. After polymerization reaction is conducted for 2 hours at −10° C., 1000 grams of 0.5% aqueous solution of sodium nitrate is added to the autoclave with stirring for 5 minutes. When left in a quiet state, the polymer solution separates from the aqueous solution in 2 minutes and becomes transparent. After separation, the polymer solution is washed with 1000 grams of water, separated, dried with calcium chloride and filtered after stirring with 5 grams of added clay. The polymer solution obtained is heated to about 100° C. while blowing nitrogen gas into it, thereby eliminating the solvent and low molecular weight polymers by carrying them off in the gas stream. 120 grams of a colorless and transparent semi-solid polybutene is obtained. The average molecular weight of this polybutene is 10,000, aluminum content is 45 p.p.m., chlorine content 10 p.p.m., and no detectable sodium and nitrogen can be found.

Example 4

500 grams of a cooled mixture of butane and butylene containing 25.0% of isobutylene is put into the same autoclave as in Example 1. 3.0 grams of aluminum chloride anhydride dispersed in 30 grams of hexane is added. The polymer solution obtained after one-hour polymerization reaction conducted at −5° C. is removed into a glass autoclave fitted with a stirring device and containing 800 grams of 2% aqueous solution of sodium oxalate. When left in a quiet state for 2 minutes after stirring for 5 minutes, the colored polymer solution becomes colorless and transparent and completely separates from the aqueous solution. Next, the polymer solution is separated and washed three times with water, by successively adding 800 grams of water to the polymer solution, stirring it strongly for 5 minutes, leaving it in a quiet state for 2 minutes and then separating. The unreacted gas is volatilized and the solution moved into a rotary evaporator. The solvent and low molecular weight polymers are eliminated under 100° C. at 10 m./m. Hg for 30 minutes. 120 grams of a colorless, transparent polybutene is obtained. The molecular weight of this polybutene is 1700, its aluminum content is 16 p.p.m., chlorine content 12 p.p.m. and no detectable sodium can be found.

Example 5

120 grams of a cooled mixture of butane and butylene containing 27.0% of isobutylene is put into a 500 milliliters glass autoclave fitted with a stirring device, thermometer and cooling hose. Next, 1.0 gram of aluminum chloride anhydride dispersed in 5 grams of a polybutene (average molecular weight 300) is added. After one-hour polymerization reaction conducted at −10° C., 200 grams of an aqueous solution of 2% potassium pyrophosphate is added to the colored polymer solution followed by 3-minutes strong stirring. When left in a quiet state for 1 minute, the polymer solution becomes colorless and transparent and completely separates from the aqueous solution. Next, the polymer solution and the aqueous solution are separated, and the polymer solution is strongly stirred for 3 minutes with 200 grams of water, which is separated after 2 minutes standing. After repeating two times the process of washing with water and separation, unreacted gas is volatilized and the soltuion is placed in a rotary evaporator. The solvent and low molecular weight polymers are removed at 100° C., 10 m./m. Hg for 30 minutes. 36 grams of a colorless and transparent polybutene is obtained. The molecular weight of this polybutene is 1850, its aluminum content 20 p.p.m., chlorine content 18 p.p.m. and no detectable potassium or phosphorus can be found.

Example 6

200 grams of 2% aqueous solution of sodium silicate is added to 120 grams of a polymer solution obtained in the same way as in Example 5. After strong stirring for 3 minutes, the mix is left in a quiet state and the aqueous solution is separated. The recovered polymer solution is dried with calcium chloride, and passed through a bed of clay in a cylindrical glass pipe 2.5 centimeters in diameter and 20 centimeters in length. Unreacted gas is volatilized. The solution is then placed in a rotary evaporator where solvent and low molecular weight polymers are removed at 100° C., 10 m./m. Hg for 30 minutes. 32 grams of colorless and transparent polybutene is obtained. The aluminum content of this polybutene is 14 p.p.m., chlorine content 17 p.p.m., and no detectable silicon or sodium is found.

Example 7

200 grams of 2% aqueous solution of sodium thiosulfate is added to 120 grams of a polymer solution obtained in the same way as in Example 5. After 3-minutes strong stirring, it is allowed to stand until the aqueous solution separates. Next, the polymer solution obtained by separation is dried with calcium chloride, and passed through a bed of clay in a cylindrical glass pipe 2.5 centimeters in diameter and 20 centimeters in length. Unreacted gas is volatilized. The polymer solution is then placed in a rotary evaporator where solvent and low molecular weight polymers are removed at 100° C., 10 m./m. Hg for 30 minutes. 32 grams of a colorless and transparent polybutene is obtained. The aluminum content of this polybutene is 20 p.p.m., chlorine content 18 p.p.m., and no detectable sulfur or sodium is found.

In similar ways, the method of this invention can be used to remove Friedel-Crafts catalyst from any hydrocarbon polymers in solution.

Having thus described the invention, what is claimed is:

1. In a process of making hydrocarbon polymer with an aluminum chloride polymerization catalyst, the improvement comprising contacting the polymer solution containing said catalyst with an aqueous solution of a water-soluble salt selected from the group consisting of a sodium, potassium and ammonium salt from the group consisting of nitrates, sulphates, thiosulphates, phosphates, oxalates and silicates to decompose and remove the polymerization catalyst, said aqueous solution being used in concentrations of at least 0.5% of said water-soluble salt.

2. In a process of making a butylene polymer with an aluminum chloride polymerization catalyst, the improvement comprising contacting the polymer solution containing said catalyst with an aqueous solution of a water-soluble salt selected from the group consisting of a sodium, potassium and ammonium salt from the group consisting of nitrates, sulphates, thiosulphates, phosphates, oxalates and silicates to decompose and remove the polymerization catalyst, said aqueous solution being used in concentrations of at least 0.5% of said water-soluble salt.

3. The process according to claim 2 wherein said polymer solution, after decomposition of the polymerization catalyst, is rinsed with water.

4. The process according to claim 3 wherein unreacted gas is removed after said polymer solution has been rinsed with water.

5. The process according to claim 3 wherein the unreacted gas, the polymer of low molecular weight and the solvent are removed after said polymer solution has been rinsed with water.

6. The process according to claim 3 wherein said polymer solution, after having been rinsed with water, is dried, and treated with clay.

References Cited

UNITED STATES PATENTS

| | | | |
|---|---|---|---|
| 2,224,349 | 12/1940 | Holm et al. | 260—683.15 |
| 2,603,665 | 7/1952 | Young | 260—683.15 |
| 2,734,892 | 2/1956 | Carter | 260—683.15X |

PAUL M. COUGHLAN, JR., Primary Examiner